United States Patent [19]

Cunningham

[11] 4,075,270
[45] Feb. 21, 1978

[54] EXTRUSION DIE MASK

[75] Inventor: George M. Cunningham, Horseheads, N.Y.

[73] Assignee: Corning Glass Works, Corning, N.Y.

[21] Appl. No.: 630,345

[22] Filed: Nov. 10, 1975

Related U.S. Application Data

[62] Division of Ser. No. 532,362, Dec. 13, 1974, Pat. No. 3,947,214.

[51] Int. Cl.$^2$ ............................................. B29D 23/04
[52] U.S. Cl. .................................. 264/209; 264/40.5
[58] Field of Search .................. 264/177 R, 209, 171; 425/380, 131.5, 466, 40.5

[56] References Cited

U.S. PATENT DOCUMENTS

| | | | |
|---|---|---|---|
| 3,459,846 | 8/1969 | Matsui et al. | 264/171 |
| 3,523,988 | 8/1970 | Roehr et al. | 264/177 R |
| 3,541,198 | 11/1970 | Ueda et al. | 264/171 |
| 3,790,654 | 2/1974 | Bagley | 264/177 R |
| 3,836,302 | 9/1974 | Kaukenien | 425/197 |
| 3,919,384 | 11/1975 | Cantaloupe et al. | 264/177 R |

*Primary Examiner*—Robert F. White
*Assistant Examiner*—John A. Parrish
*Attorney, Agent, or Firm*—Burton R. Turner; Clarence R. Patty, Jr.

[57] ABSTRACT

A mask or face plate, having an orifice or opening formed therethrough of desired size and configuration, is positioned against the discharge face of an extrusion die. The mask restricts the flow of extrudable material through the die so that such material will conform to the size and configuration of the opening or orifice formed through the mask. A recess formed in the face of the mask adjacent the discharge face of the extrusion die, surrounds the orifice formed therethrough, and communicates with said orifice by means of a gap formed in the inlet face of the mask between said recess and said orifice. The method of extrusion set forth with respect to the recessed or scalloped mask has particular utility when utilized with an extrusion die for forming cellular or honeycomb structures, in that the predetermined gap meters a controlled flow of additional batch material from the recess to the outer boundaries of the extruded honeycomb article passing through the orifice in said mask to encapsulate the honeycomb structure with a smooth uniform skin having improved isostatic crushing strength.

2 Claims, 9 Drawing Figures

EXTRUSION DIE MASK

This is a division of application Ser. No. 532,362, filed Dec. 13, 1974, now U.S. Pat. No. 3,947,214.

BACKGROUND OF THE INVENTION

This invention pertains to the art of manufacturing extruded articles from extrudable material such as ceramic batches and similar materials which have the property of being able to flow or plastically deform during extrusion, while being able to become sufficiently rigid immediately thereafter so as to maintain their structural integrity. More particularly, the present invention relates to an improved extrusion die mask utilized in conjunction with an existing extrusion die, for not only providing such extrusion die with greater versatility, but also for improving skin characteristics about cellular or honeycomb articles which may be extruded by such die.

The extrusion die may be of virtually any known construction, however the extrusion die mask of the present invention has particular application with respect to extrusion dies having multiple core pins for forming cellular or honeycomb structures, such as disclosed in U.S. Pat. No. 3,790,654. That is, such extrusion dies for making honeycomb structures necessitate the formation of numerous core pins, and accordingly the manufacture of such dies is not only very complex but quite costly. Further, every time a honeycomb structure having a new size or shape is required, it necessitates the burdensome manufacture of an additional new costly die. Not only does this require the maintenance of a relatively large inventory of extrusion dies with different sizes and configurations, but also many of such dies become obsolete as size and shape requirements are varied.

U.S. Pat. No. 3,836,302 discloses a mask or face plate for overlying a portion of the discharge face of an extrusion die so as to provide such die with greater flexibility and variability. The mask of said invention did in fact function satisfactorily to provide extrusion dies with greater flexibility and variability, and when such mask was utilized with dies for forming honeycomb structures, they also provided an integral skin or casing about such structures. However, during the formation of the skin about the honeycomb structures, the mask had a tendency to crush peripheral cells as the structure passed through the central opening of the mask. Further, the surface of the skin produced by such mask had a tendency to be fairly rough, and was not of a character to provide a high degree of isostatic crushing strength.

Accordingly, the present invention has overcome the problems of rough skin texture, peripheral cell distortion, and low isostatic crushing strength which resulted from the utilization of the mask or face plate of the prior art, by providing an improved extrusion die mask having a recess reservoir and a flow control or metering gap in its inlet face for forming a substantially smooth integral skin about a honeycomb article without causing peripheral cell distortion and with improved isostatic crushing strength.

SUMMARY OF THE INVENTION

In its simplest form, the present invention is directed to a face plate or mask for overlying a portion of the discharge face of an extrusion die so as to provide an article extruded by such die with an integral skin of desired thickness, texture, and improved strength.

The invention has particular application for use with extrusion dies for forming thin walled cellular or honeycomb structures which are provided with an integral shell or casing about the honeycomb network. Cellular or honeycomb structures refer to any structure having a plurality of openings or passages of any desired size or shape extending therethrough, and the present invention provides the advantage of being able to form a plurality of such structures with different sizes and shapes from a single extrusion die while simultaneously providing a bounding wall or shell about the desired shape with a predetermined thickness and surface texture.

The mask or face plate of the present invention has a blocking surface positioned adjacent the discharge surface of an extrusion die so as to block or mask-off the discharge flow of extrudable materials which would normally flow through the masked-off portion of the extrusion die. An opening or orifice of desired size and configuration is formed centrally through the mask such that the inlet end of such orifice is in direct communication with the discharge face of the extrusion die. An annular recessed reservoir or scalloped portion is formed in the blocking surface about the orifice, and communicates with an inlet portion of the orifice by means of a predetermined gap. Since the mask has particular utility when utilized with extrusion dies for forming honeycomb structures by providing an integral skin thereabout, the predetermined gap is of great significance in view of the fact that it controls the thickness of the skin applied about the outer periphery of the honeycomb article. Accordingly, batch material extruded adjacent the periphery of the inlet end of the orifice is received within the annular reservoir and controllably fed by means of the predetermined gap to a tapered or chamfered inlet portion of the orifice for forming a skin about the extruded honeycomb article passing therethrough. The mask will also function with a straight inlet, that is, without a taper or chamfer. Masks of the present invention are removably mounted to the die structure so as to be readily interchangeable with different extrusion dies, thus providing a greater degree of flexibility in their utilization.

It thus has been an object of the present invention to provide a novel extrusion method for existing extrusion dies so as to provide greater flexibility and variability in the dies and configurations of the extruded product which may be formed from such dies.

A further object of the present invention has been to provide a novel method for utilizing existing extrusion dies which form honeycomb structures, to form such structures with different sizes and configurations while simultaneously forming a substantially smooth integral skin or casing thereabout with improved isostatic crushing strength and without materially distorting peripheral cells about the honeycomb structure.

DESCRIPTION OF THE PREFERRED EMBODIMENTS

Figure 1:
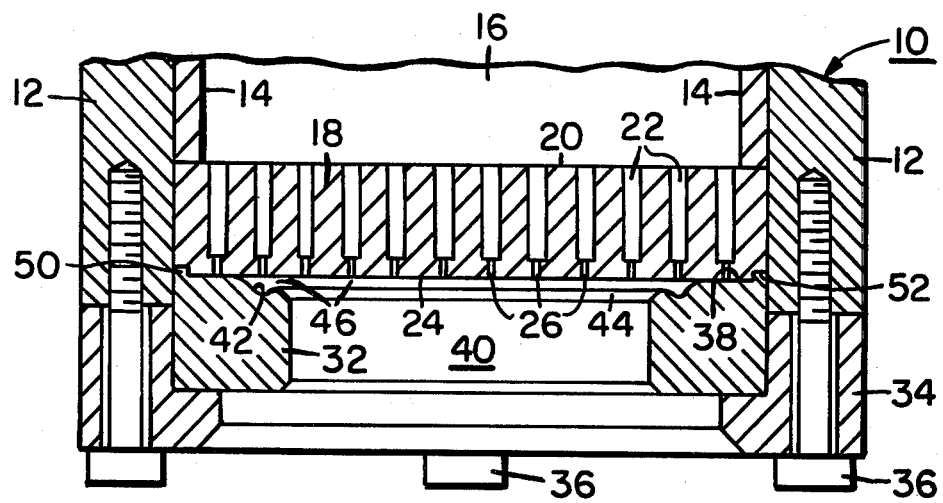
FIG. 1 is an elevational view in section of an extrusion die assembly including the extrusion die mask of the present invention.

Referring now to the drawings, and particularly FIG. 1, an extrusion die apparatus 10 is shown including a support structure 12 for a cylinder 14, housing an extrusion chamber 16. An extrusion die 18 of any desired configuration is positioned adjacent the outlet end of the extrusion chamber 16. Since the present invention has particular application with respect to extrusion dies for forming honeycomb structures, such a die is shown for purposes of illustration. The die body 18 has an inlet face 20 provided with a plurality of openings or feed passageways 22, and an outlet face 24 which may be provided with a plurality of interconnected discharge slots 26. The feed passageways 22 communicate with selected areas of the discharge slots 26 so as to deliver the batch material from the extrusion chamber 16 to the discharge slots 26. The interconnected discharge slots 26 form a grid work through which the batch material is extruded to form the matrix of the coherent honeycomb structure.

An extrusion die mask 32 is positioned adjacent the outlet face 24 of the extrusion die 18 and is removably secured in position adjacent the outlet face by means of a retaining ring 34 and a plurality of bolts or cap screws 36. The mask 32 has a blocking surface 38 which is positioned adjacent the outlet face 24 of the die 18 and surrounds a central opening or orifice 40 of desired size and configuration extending through the mask 32. An annular recess or reservoir area 42 is formed in the blocking surface 38 about an inlet portion 44 of orifice 40. The annular recess 42 is radially outwardly offset with respect to orifice 40, and communicates therewith by means of a predetermined channel or gap 46 formed in blocking surface 38 between the inlet portion 44 of orifice 40 and the annular recess 42. As shown, the inlet portion 44 is preferably tapered so as to facilitate the flow of batch material delivered by gap 46 from the reservoir area 42 to the orifice 40, however, the mask will also function without a tapered inlet.

Whereas the blocking surface 38 restricts the flow of extrudable material through the die 18 to those areas of such die which are in open communication with the orifice 40, the annular recess or reservoir area 42 provides a supply of batch material which is controllably fed by the predetermined gap 46 to the orifice 40 for forming a skin about the honeycomb article extruded through die 18. The orifice 40 may have a chamfered outlet end 48 for facilitating the withdrawal of the extruded article. Further, a peripheral positioning rim 50 may be formed on blocking surface 38 for positionment within an aligning recess 52 formed in the outlet face 24 of die 18.

Figure 5:
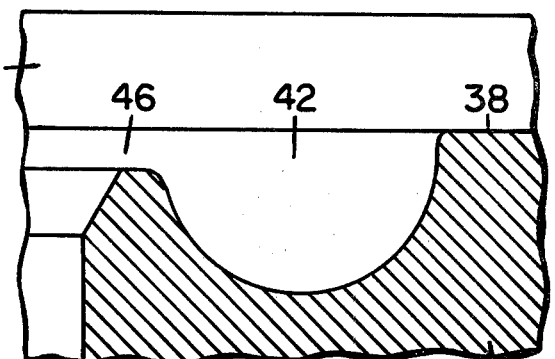
FIGS. 5, 6, 7, 8, and 9 illustrate further embodiments of the recessed reservoir which may be formed in the face of the extrusion die mask.
Figure 6:
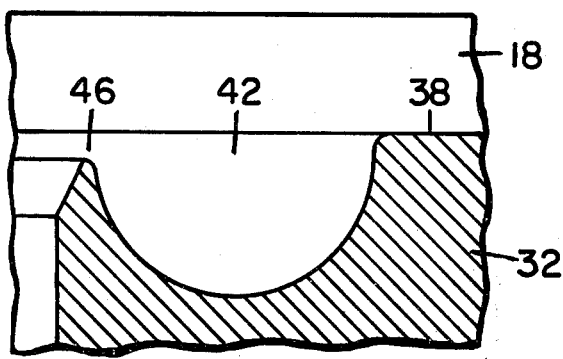
Figure 7:
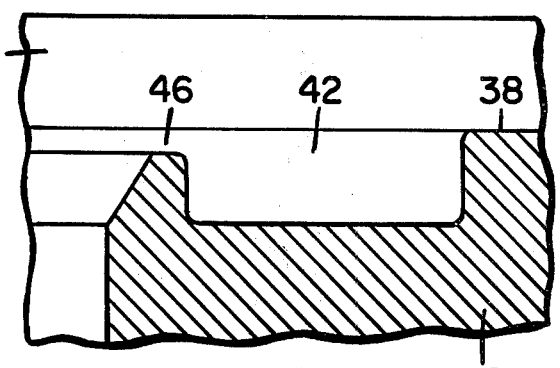
Figure 8:
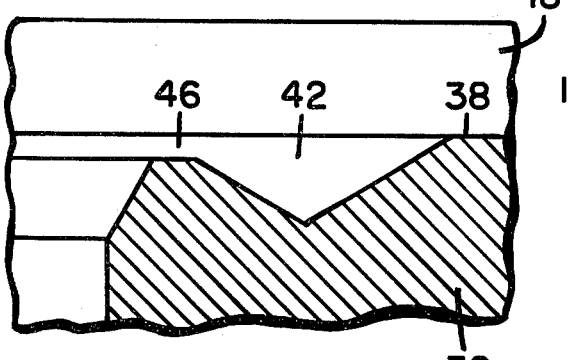
Figure 9:
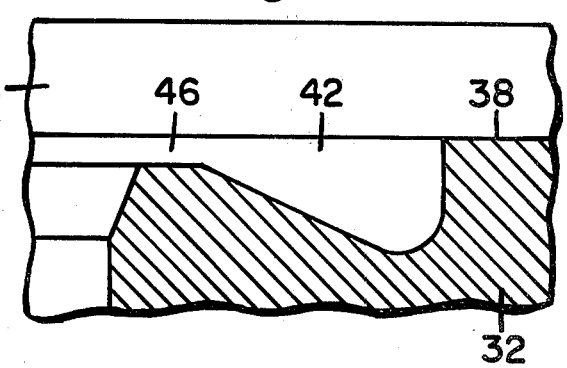

Although the cross sectional shape of the annular recess or reservoir area 42 may vary as shown in FIGS. 5 through 8 inclusive, the contour of the reservoir as shown in FIGS. 1 through 4 inclusive is presently preferred. As will be apparent from FIG. 4, the preferred contour is in the form of a shallow recess formed by striking the curvature from a center of radius positioned above the blocking surface. The contours of the recessed portion 42 of FIGS. 5 and 6 are characterized by being substantially deeper than that of FIG. 4, since the centers of radius for their curvatures are below the blocking surface 38. In FIG. 6, the gap 46 is characterized by a pointed ridge rather than a flat surface as disclosed in the other embodiments. FIG. 7 discloses a recessed or reservoir area 42 having a rectangular cross sectional configuration, whereas FIG. 8 discloses such reservoir area having a triangular cross sectional configuration, and FIG. 9 discloses the reservoir area having a wedge shaped cross sectional configuration.

The smoothly curved contour of the recess 42 is preferred for facilitating the flow of batch material from the die 18 into the reservoir and then outwardly through metering channel or gap 46 into the orifice 40 for forming a skin about the outer boundary of the honeycomb article extruded by die 18 and passed through orifice 40. The thickness of the skin formed on the honeycomb article is controlled by the gap depth 46. That is, by increasing the gap depth, a thicker skin or outer casing can be provided about the extruded article, whereas a reduction in the depth of gap 46 will produce a thinner skin. In view of the fact that the batch material from die 18 which flows into reservoir 42 is compacted within the reservoir before flowing outwardly through the metering gap 46, the batch from reservoir 42 provides a solid continuous smooth-surface skin about the honeycomb article without crushing or materially distorting peripheral cells of the article, as was common with a prior art device. Accordingly, with the mask of the present invention it is possible to provide improved isostatic crushing strength to the honeycomb articles. In fact, using substantially identical batch compositions and extrusion procedures, it has been found that through the utilization of the mask of the instant invention, over that of the prior art, isostatic crushing strengths have increased on the order of 100 to 250 psi.

Figure 2:
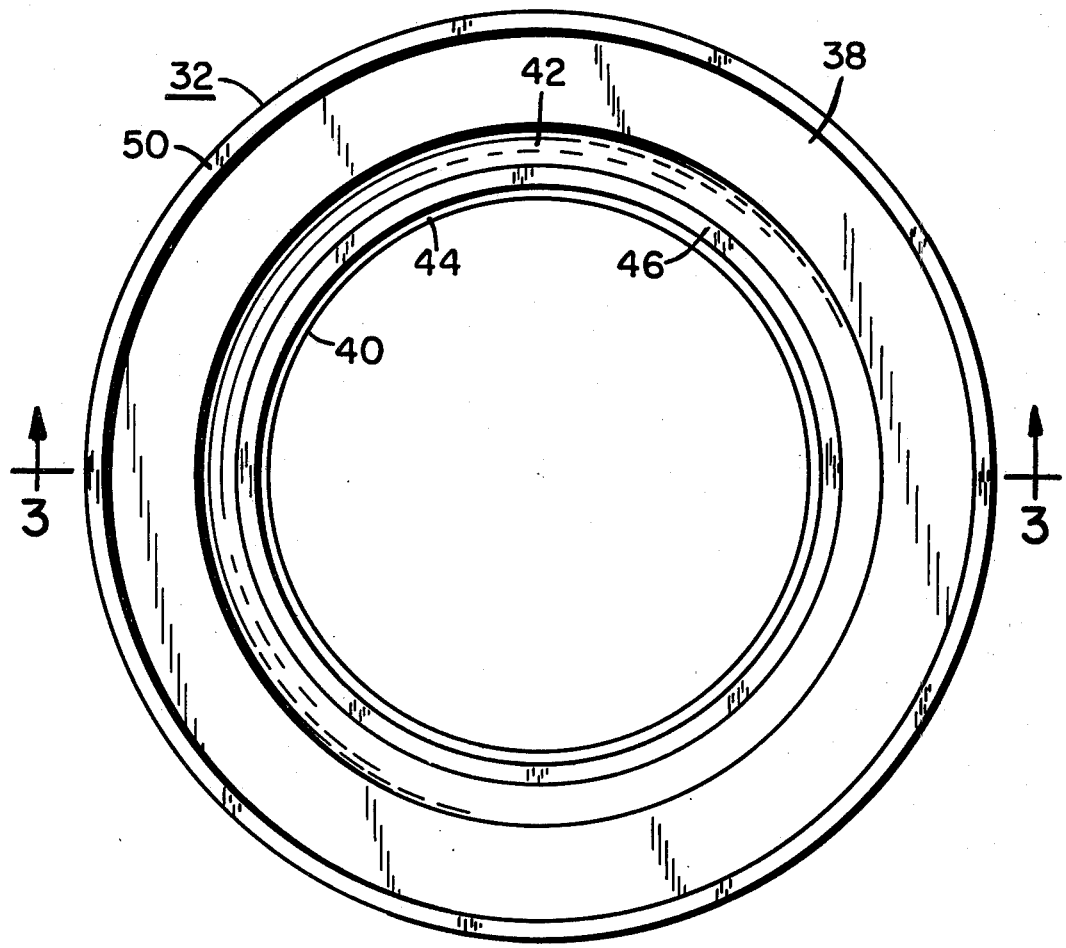
FIG. 2 is a top plan view of the mask shown in FIG. 1.
Figure 3:
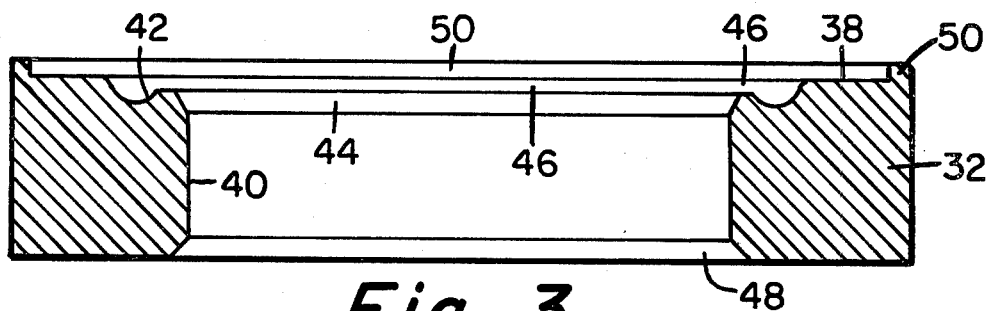
FIG. 3 is a cross sectional view in elevation taken along line 3—3 of the mask shown in FIG. 2.
Figure 4:
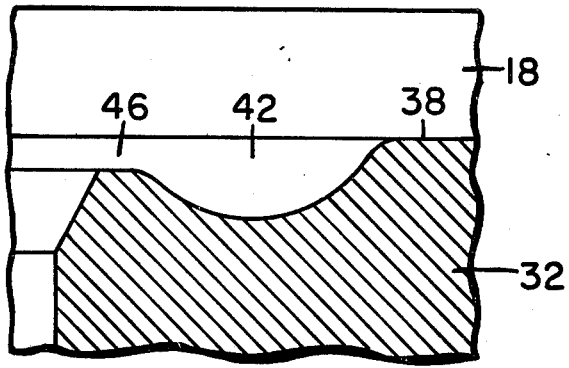
FIG. 4 is an enlarged fragmental elevational view partially in section illustrating the configuration and positionment of the recessed reservoir and gap formed in the extrusion die mask relative to the extrusion die.

Although the orifice 40 is shown in FIG. 2 in the shape of a circle, the size and configuration thereof may vary as desired, and may include virtually any geometric shape such as oval, square, triangular, eliptical, etc. Further, it will be appreciated that the various dimensions of the orifice may vary considerably with the material being extruded, however, the following specific example is given as an illustration for extruding a clay type of material. A stainless steel mask was formed having a circular orifice provided with an inlet portion having a 25° taper with the axis of extrusion and extending from a flat gap surface to the periphery of the main orifice having a diameter of about 4¼ inches. The gap had a depth of 0.015 inches and the annular recess had a radius of 3/32 inch with a radius center above the blocking surface, so as to form a recess depth of about 0.05 inches. Clay material was extruded through a known honeycomb die and passed through the circular orifice of the mask, with peripheral portions of the extruded material being collected within the annular recess and metered through the gap to form a cylindrical honeycomb structure having a smooth integral outer skin with a thickness of about 0.015 inches. The cells about the periphery of the extruded article were not deformed and virtually identical to interior cells, and the article after firing had an isostatic crushing strength of about 480 psi.

It will be understood that the foregoing example merely sets forth a now preferred embodiment whereas the metering channel or gap may vary as desired to produce a predetermined thickness with gaps of about 0.01 to about 0.06 providing operable results. Further, the depth of the recess may be varied by either increasing or decreasing both the radius of curvature and the center of radius, when utilizing a curved recess, or by merely increasing or decreasing the depth per se when utilizing a polygonal recess. Further, it appears that the entrance angle may be varied over rather wide limits, such as from 0° to 45°, without affecting operability. That is, the mask will function with a zero degree entrance angle, however to reduce corner wear an entrance angle is preferred.

Although the now preferred embodiments of the invention have been set forth, it will be apparent to those skilled in the art that various changes and modifications may be made thereto without departing from the spirit and scope thereof as defined in the appended claims.

I claim:

1. A method of forming an integral skin about an extruded honeycomb article as the article is being extruded, comprising the steps of extruding batch material through a die to form a honeycomb article, simultaneously collecting batch material extruded through said die in a reservoir peripherally of said extruded article, flowing such collected material radially inwardly through a predetermined gap toward the outer periphery of said extruded article, and forming an integral skin of predetermined thickness proportional to said predetermined gap on the outer periphery of said extruded article with the material flowing radially thereto.

2. A method of forming an integral skin on a honeycomb article as defined in claim 1 including the step of metering the flow of said extruded batch material from said reservoir to the periphery of the extruded article by controlling the depth of said predetermined gap and thereby controlling the thickness of the skin applied to said extruded article.

* * * * *

UNITED STATES PATENT AND TRADEMARK OFFICE
CERTIFICATE OF CORRECTION

PATENT NO. : 4,075,270
DATED : February 21, 1978
INVENTOR(S) : George M. Cunningham It is certified that error appears in the above-identified patent and that said Letters Patent are hereby corrected as shown below:

Column 6, claim 1, line 5, before "batch" insert --such--; line 8, before "predetermined" insert --gap of--; same line, cancel "gap" and substitute --depth--; line 12, before "material" insert --extruded--; Column 6, claim 2, line 18, before "controlling" insert --simultaneously directly--.

Signed and Sealed this

Eleventh Day of July 1978

[SEAL]

Attest:

RUTH C. MASON
Attesting Officer

DONALD W. BANNER
Commissioner of Patents and Trademarks